No. 663,436. Patented Dec. 11, 1900.
E. M. HEYLMAN.
SCRAPER FOR SOIL CUTTING DISKS.
(Application filed Aug. 30, 1900.)
(No Model.)
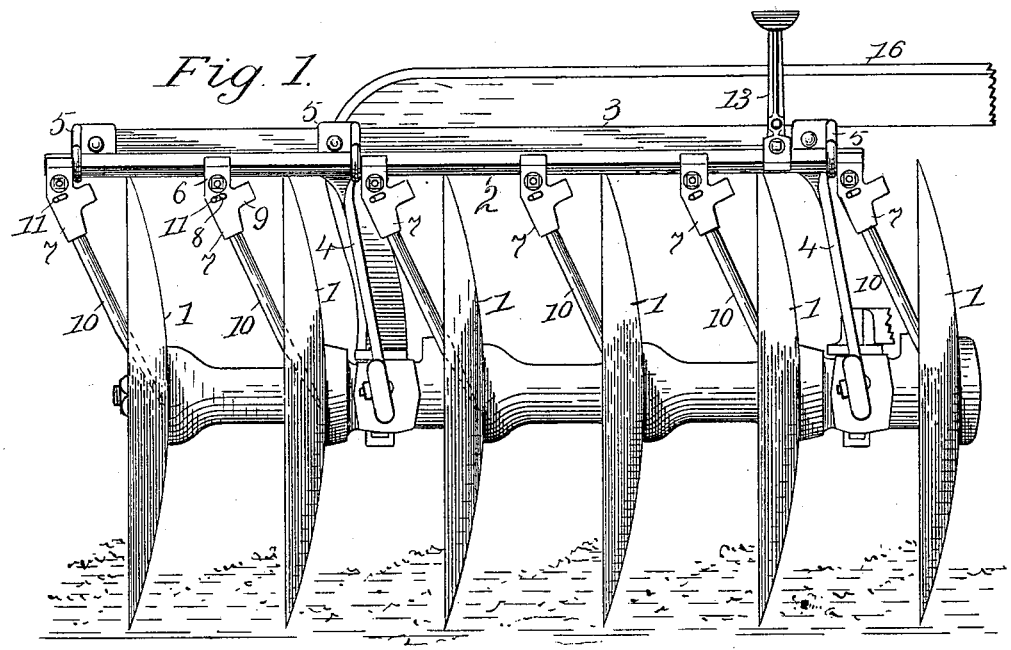
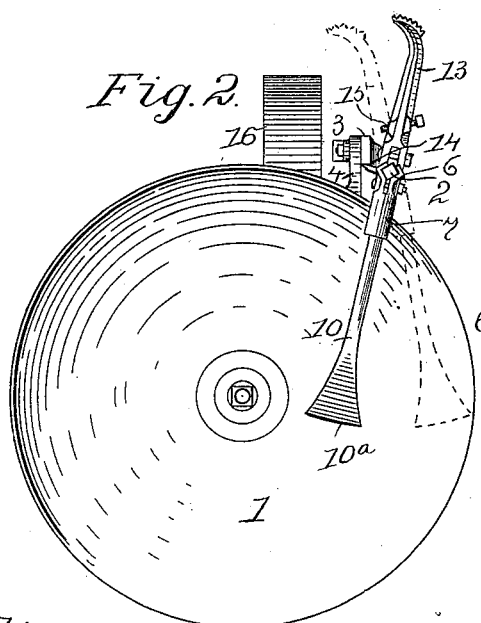
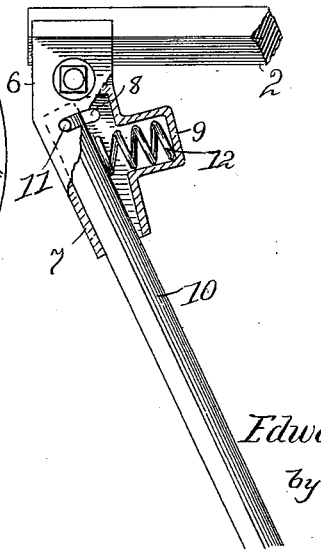
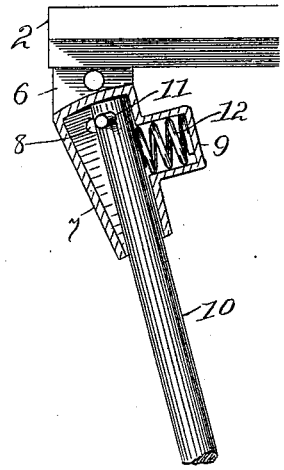
Witnesses,
Nora Graham
Ina Graham
Inventor,
Edward M. Heylman
by L. P. Graham
his attorney.

UNITED STATES PATENT OFFICE.

EDWARD M. HEYLMAN, OF CANTON, ILLINOIS, ASSIGNOR TO THE PARLIN & ORENDORFF COMPANY, OF SAME PLACE.

SCRAPER FOR SOIL-CUTTING DISKS.

SPECIFICATION forming part of Letters Patent No. 663,436, dated December 11, 1900.

Application filed August 30, 1900. Serial No. 28,579. (No model.)

*To all whom it may concern:*

Be it known that I, EDWARD M. HEYLMAN, of the city of Canton, county of Fulton, and State of Illinois, have invented an Improved Scraper for Soil-Cutting Disks, of which the following is a specification.

This invention relates to concaved disks used as plows, harrows, furrow-openers for planters, and the like; and the object is to provide superior means for cleaning the concaved surfaces of such disks of soil and trash that would otherwise adhere and interfere with the proper operation of the implement in which disks are used.

The invention is exemplified in the structure hereinafter described, and it is defined in the appended claims.

In the drawings forming part of this specification, Figure 1 is a rear elevation of one of the gangs of a disk harrow with my invention applied thereto. Fig. 2 is a side elevation of the gang, showing the concaved face of one of the disks and illustrating the action of the scraper thereon. Fig. 3 is a vertical section sidewise through one of the holders for a scraper-rod, showing the position of the rod in relation to the holder when the scraper is inoperative or at rest. Fig. 4 is a section similar to that shown in Fig. 3, but in this instance the relation of the scraper-rod to the scraper-rod holder is that which exists when the scraper is moved from near the center of the disk to near the circumference thereof.

The soil-cutting disks of the harrow are each designated by the reference-numeral 1, and the rock-shaft on which the holders for the scraper-rods are mounted is designated by numeral 2.

At 3 is shown a bar supported from the axle of the harrow-gang on arms 4, the brackets in which the rock-shaft 2 journals are attached to bar 3 at 5, and an end of a main cross-bar of a harrow-frame is shown at 16.

One disk and the scraper therefor are fully representative of my invention, the particular implement with which the disk is connected is immaterial, and such details of a harrow-frame as are shown are intended to be merely explanatory of one of the various uses of the disks to which the scrapers are attached.

The rock-shaft is shown at 2, the scraper-rod at 10, and the scraper at $10^a$. A holder for the upper end of the scraper-rod consists of a clip 6, which is made to embrace the rock-shaft and a socket extension 7 of the clip, the socket of which is enlarged taperingly toward the rock-shaft in a direction parallel with the axis of the rock-shaft. The clip is fastened to the rock-shaft at one side of the concave face of a disk, and the socket extends toward a point in the rear of the center of such concave surface. An extension 9 is formed on the socket on the side next the disk and is hollowed to form a housing for a spring 12. The front and back sides of the socket-shell, either or both, are slotted, as shown at 8, and such slots preferably describe arcs of circles drawn with the lower end of the socket for a center. The upper end of scraper-rod 10 is round in cross-section. It is inserted into the socket 7. It has a pin 11, which engages slots 8 and holds the rod in the socket, and it approximately conforms to the size of the contracted socket-opening. The upper end of the rod has room to swing in the socket lengthwise of the rock-shaft, and the spring 12 bears against such upper end and tends to hold the scraper in the position shown in Fig. 3.

When the rock-shaft is in the position shown in solid lines in Fig. 2, the spring 12 presses the upper end of rod 10 against the outer wall of the socket and holds the scraper in light contact with or close proximity to the depressed part of the concaved surface of the disk. Soil and trash tend to accumulate nearer the circumference of the disk, and when it is desired to remove them the shaft is rocked in a direction to carry the scraper to the position shown in dotted lines. The natural tendency of the scraper is to swing backward in a plane at right angles with the rock-shaft; but this is not in accordance with the surface of the disk, and so the spring 12 yields and the scraper-rod rocks on its longitudinal axis to permit the scraper to follow the surface of the disk. The scraper slides cornerwise into contact with the soil and trash on the disk. It is always so close against the surface of the disk that no fibrous trash may intervene, and its cutting edge $10^a$ is so limited in extent that no great force is required to overcome its braking action on the disk.

The scraper adapts itself automatically to the surface of the disk, and all the operator needs to do is to rock the shaft in a direction to carry the scrapers away from the center of the disks. In this instance a foot-lever 13 is attached to the rock-shaft and provided with stops 14 and 15, which strike one against the under surface of bar 3 to limit the forward swing of the scrapers and the other against the upper surface of the bar to limit the backward swing of the scrapers. This, however, is something that may be varied without departing from the principle of my invention, and the means to rock the shaft or its equivalent are somewhat immaterial.

The spring 12 bears against the rounded surface of the scraper-rod and tends to hold the scraper in contact with the disk without interfering with the rock of the rod on its longitudinal axis.

I claim—

1. The combination with a concaved soil-cutting disk, of a rockable scraper-holder, a round scraper-rod swingable and rockable in the holder and a spring bearing against the rounded surface of the scraper-rod to restrain its swing without interfering with its rocking motion on its longitudinal axis.

2. The combination with a concaved soil-cutting disk, of a rockable scraper-holder having a socket widening inwardly, a round scraper-rod conforming to the mouth of the socket and adapted to have both swinging and rocking motion in the socket, and a spring bearing against the rounded surface of the rod, substantially as described.

In testimony whereof I sign my name in the presence of two subscribing witnesses.

EDWARD M. HEYLMAN.

Witnesses:
 A. L. GARDNER,
 R. A. HALL.